3,016,803
MOUNTING OF FACE PLATES FOR BORING
AND MILLING MACHINES
Willi Schraub, Beckrath, Wickrath-Niers, Germany, assignor to Scharmann & Co. G.m.b.H., Rheydt, Rhineland, Germany
Filed Mar. 9, 1960, Ser. No. 13,889
Claims priority, application Germany Mar. 17, 1959
5 Claims. (Cl. 90—11)

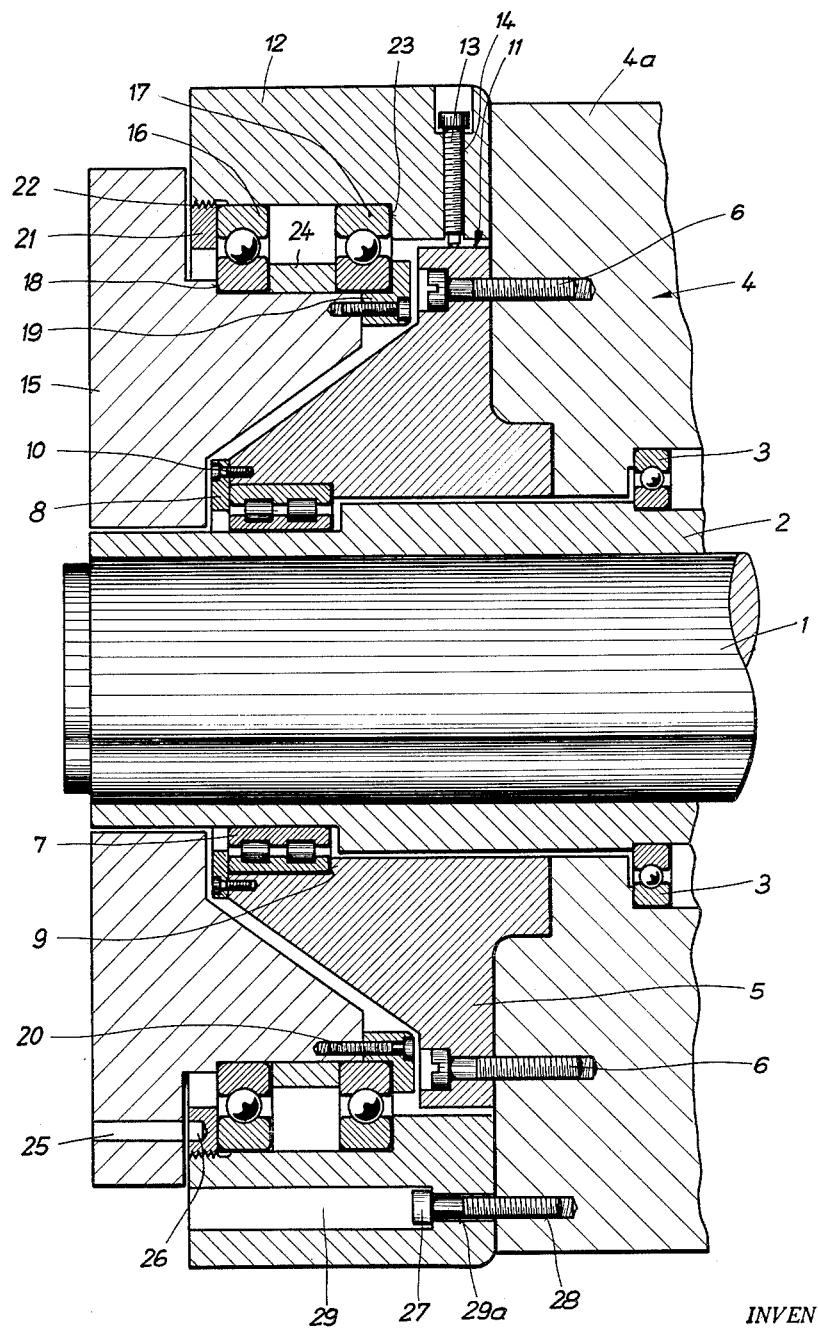

The present invention relates to a mounting for the face plates of boring and milling machines in which the boring spindle or cutter bar is rotatably journalled in the headstock by means of a sleeve or the like and is longitudinally displaceable with regard to the headstock. In order to prevent that, when simultaneously boring and facing at different speeds of the boring spindle and face plate respectively, the non-avoidable play in the bearings of the boring spindle and face plate will add up due to the cutting pressure, it has been suggested in connection with such mounting to journal the face plate directly, i.e. independently of the boring spindle, on a supporting member connected to the headstock, for instance a sleeve.

With such an arrangement, the boring spindle and the face plate rest by means of their bearings independently of each other on the headstock. Consequently, when simultaneously boring and facing at different speeds, no overlapping of the tolerances, i.e. no addition of the tolerance magnitudes of the individual bearings can occur. Consequently, precisely round bores can be produced at different speeds of the boring spindle and face plate respectively.

The heretofore known devices of the above mentioned type have the drawback that the bearing tolerances had to be accepted as they prevailed in the respective machines.

It is, therefore an object of the present invention to provide an arrangement which will make it possible to equalize the bearing tolerances of a construction of the above mentioned type while simultaneously retaining the advantages derived from an independent mounting of the face plate and drilling spindle.

It is another object of this invention to provide a mounting for a face plate of boring and milling machines, in which the boring spindle and face plate are independently journalled while it is possible to adjust the bearing tolerances of the face plate and of the bearing spindle in a very simple manner.

These and other objects and advantages of the invention will appear more clearly from the following specification in connection with the accompanying drawing showing a vertical section through a face plate mounting according to the invention with a portion of the headstock.

In conformity with the present invention, the face plate is journalled in an adjustable member which is radially adjustable with regard to a supporting member, for instance a sleeve. The supporting member is provided with an annular surface coaxial with the boring spindle, radially adjustable bolts passing through said adjustable member and engaging said annular surface.

In conformity with a further development of the invention, the adjustable member is connected to the headstock by means of axially extending bolts which pass through bores in said adjustable member with sufficient play to allow axial adjustment of said adjustable member to the desired extent. While the first mentioned bolts permit radial adjustment of the adjustable member resting on the supporting member, the last mentioned bolts are intended for connecting the adjustable member to the headstock. According to a further feature of the invention, the adjustable member has its front end provided with a threaded ring for holding the bearing of the face plate, said ring being adjustable through slots in said face plate.

Referring now to the drawing in detail illustrating the invention in connection with a boring machine, the structure shown in said drawing comprises a boring spindle or cutter bar 1 of the boring machine having keyed thereto in any convenient manner a sleeve 2. Boring spindle 1 is by means of said sleeve 2 and antifriction bearings 3 (one only being shown) journalled in the head stock 4. A supporting member 5 of sleeve-like shape is connected to the front wall 4a of the headstock 4, by means of bolts 6. The spindle 1 is by means of sleeve 2 and antifriction bearings 7 additionally journalled in the supporting member 5, said bearing 7 being held in its position by means of a shoulder 9 in the supporting member 5 and by a ring 8. Ring 8 is detachably connected to the supporting member 5 by means of screws 10.

In conformity with the present invention, the supporting member 5 is provided with an annular surface 11 which is substantially coaxial with the spindle 1. The supporting member 5 is surrounded by an angular member 12 which latter carries radially arranged bolts 13 the lower ends of which are adapted to engage the annular surface 11. By means of said radial bolts 13 which threadedly engage correspondingly threaded bores 14 in member 12, it is possible to radially adjust the annular member 12 with regard to the supporting member 5 independently of the spindle 1.

The face plate 15 is rotatably journalled in the annular member 12 by a double bearing 16, 17 which is held on said face plate 15 by means of a shoulder 18 and a ring 19. Ring 19 is detachably connected to the face plate 15 by means of bolts 20. The arrangement according to to the invention furthermore comprises a ring 21 provided with an outer thread 22 threadedly engaging a corresponding thread in the annular member 12. As will be evident from the drawing, ring 21 together with a shoulder 23 in annular member 12 holds the double bearing 16, 17 in annular member 12. The two bearings 16, 17 are spaced from each other by a spacer member 24. In this way, also face plate 15 will be held in its respective position.

If it is desired to detach the face plate 15 from the headstock 4, it is merely necessary to insert a suitable tool in a corresponding bore 25 in the face plate and into a recess 26 in order to be able to detach ring 21 from annular member 12 by rotating the face plate. Thereupon, face plate 15 can be removed from annular member 12 together with the double bearing 16, 17.

If it is desired, also to detach the adjustable annular member 12, the bolts 13 are slightly turned so as to move in outward direction, and the bolts 27 are detached by means of which member 12 is connected to the headstock 4. These bolts 27 which similar to the bolts 13 are arranged along a circle in annular member 12 engage threaded bores 28 in the headstock 4. It should be noted that the heads of the bolts 27 and the shanks of said bolts engage corresponding bores 29 and 29a with a sufficient play to allow radial adjustment of the annular member 12 within certain desired limits. The adjustment of the face plate with regard to the boring spindle may in assembled position of the various elements be effected in the following manner:

First the bolts 27 are slightly loosened, and then annular member 12 together with the double bearing 16, 17 and face plate 15 are adjusted by adjustment of bolts 13. After the adjustment has been effected to the desired extent, bolts 27 are tightened again.

It is, of course, to be understood that the present invention is, by no means, limited to the particular construction shown in the drawing but also comprises any modifications within the scope of the appended claims.

What I claim is:

1. In combination for use in connection with boring and milling machines: a headstock, a boring spindle rotatably and axially displaceably mounted in said headstock, supporting means connected to said headstock, a face plate, and means rotatably supporting said face plate and being radially adjustably supported by said supporting means, said boring spindle extending through said supporting means and being additionally journalled therein.

2. In combination for use in connection with boring and milling machines: a headstock, a boring spindle rotatably and axially displaceably mounted in said headstock, a supporting member connected to said headstock and having an outer peripheral cylindrical surface substantially coaxial with said spindle, a face plate, annular means rotatably supporting said face plate and including means adjustably engaging said cylindrical surface for radially adjusting said annular means and thereby said face plate, and means for connecting said annular means in its respective adjusted position to said headstock, said boring spindle extending through said supporting member and being additionally journalled therein.

3. In combination for use in connection with boring and milling machines: a headstock, a boring spindle rotatably and axially displaceably mounted in said headstock, a supporting member connected to said headstock and having an outer peripheral cylindrical surface substantially coaxial with said spindle, an annular member surrounding said supporting member in spaced relationship thereto and provided with radial threaded bores therethrough, a plurality of threaded bolts adjustably extending through said threaded bores and engaging said cylindrical surface, said annular member being provided with bores extending in axial direction thereof, connecting bolts extending through said last mentioned bores for connecting said annular member to said headstock, said last mentioned bores having a diameter exceeding the diameter of said connecting bolts at least by an amount sufficient to permit the desired maximum radial adjustment of said annular member with regard to said cylindrical surface and having means supported by said annular member for receiving and rotatably supporting a face plate.

4. In combination for use in connection with boring and milling machines: a headstock, a boring spindle rotatably and axially displaceably mounted in said headstock, a supporting member connected to said headstock and having an outer peripheral cylindrical surface substantially coaxial with said spindle, an annular member surrounding said supporting member in spaced relationship thereto and provided with radial threaded bores therethrough, a plurality of threaded bolts adjustably extending through said threaded bores and engaging said cylindrical surface, said annular member being provided with bores extending in axial direction thereof, connecting bolts extending through said last mentioned bores for connecting said annular member to said headstock, said last mentioned bores having a diameter exceeding the diameter of said connecting bolts at least by an amount sufficient to permit the desired maximum radial adjustment of said annular member with regard to said cylindrical surface, said annular member being provided at the inner periphery thereof with an annular cutout, bearing means mounted in said cutout, ring means threadedly and adjustably engaging a portion of said cutout for holding said bearing means in said cutout, and a face plate rotatably supported by said bearing means and provided with passage means extending through said face plate for introducing an adjusting tool therethrough for engagement with an adjustment of said ring means, said boring spindle extending through said supporting member and being additionally journalled therein.

5. An arrangement according to claim 4, in which said ring means is provided with a bore arranged in substantially axial alignment with said passage means of said face plate.

References Cited in the file of this patent

UNITED STATES PATENTS 2,577,942    Agins    Dec. 11, 1951

FOREIGN PATENTS 876,791    Germany    May 18, 1953